United States Patent [19]
Keener

[11] Patent Number: 5,714,178
[45] Date of Patent: Feb. 3, 1998

[54] ROUNDER BAR

[76] Inventor: Michael J. Keener, 2421 Elden, Unit D, Costa Mesa, Calif. 92627

[21] Appl. No.: 708,871

[22] Filed: Sep. 5, 1996

Related U.S. Application Data

[63] Continuation of Ser. No. 381,745, Feb. 1, 1995, abandoned.

[51] Int. Cl.$^6$ ................ A21C 11/00; A21C 3/02
[52] U.S. Cl. .............. 425/333; 249/115; 425/332; 425/364 R; 426/512
[58] Field of Search ............... 425/222, 332, 425/333, 364 R, 374, 403, 96; 249/115; 426/512

[56] References Cited

U.S. PATENT DOCUMENTS

| | | |
|---|---|---|
| Re. 18,554 | 7/1932 | Sternberg. |
| B 312,139 | 1/1975 | Rees. |
| 793,155 | 6/1905 | Piper. |
| 832,470 | 10/1906 | Frank. |
| 854,308 | 5/1907 | Petri. |
| 1,152,348 | 8/1915 | Streich. |
| 1,303,013 | 1/1919 | Brainbridge ............ 425/332 |
| 1,965,413 | 7/1934 | Harber et al.. |
| 2,035,188 | 3/1936 | Quick. |
| 2,165,495 | 7/1939 | Marasso. |
| 2,191,263 | 2/1940 | Waring ............... 249/115 |
| 2,719,495 | 10/1955 | Heuwing. |
| 2,858,775 | 11/1958 | Marasso. |
| 2,867,000 | 1/1959 | Huszar. |
| 2,878,659 | 3/1959 | Prance et al. ........... 249/115 |
| 3,033,008 | 5/1962 | Davis ................. 249/115 |
| 3,168,056 | 2/1965 | Engels. |
| 3,279,936 | 10/1966 | Forestek .............. 249/115 |
| 3,377,965 | 4/1968 | Atwood. |
| 3,448,697 | 6/1969 | Atwood. |
| 3,521,578 | 7/1970 | Fraioli. |
| 3,925,530 | 12/1975 | Rees. |
| 3,988,114 | 10/1976 | Gorin et al. ........... 425/333 |
| 4,008,025 | 2/1977 | Campbell. |
| 4,025,273 | 5/1977 | Mauer et al. .......... 425/332 |
| 4,306,850 | 12/1981 | Cummins. |

FOREIGN PATENT DOCUMENTS

| | | | |
|---|---|---|---|
| 1586203 | 2/1970 | France ................ 249/115 |
| 953422 | 11/1956 | Germany ............ 425/364 R |

*Primary Examiner*—Khanh P. Nguyen
*Attorney, Agent, or Firm*—Knobbe, Martens, Olson & Bear, LLP

[57] ABSTRACT

A rounder bar for use with conventional dough manufacturing equipment is used to convert a piece of dough into a spherical dough ball. The rounder bar includes a contact face used to engage and shape the piece of dough. The contact face has a gradually varying height and radius to form a compression section proximate the first end of the bar and a rounding section proximate the second end of the bar. A bumpy texture and coating on the contact face prevent the dough from sticking to the rounder bar.

7 Claims, 6 Drawing Sheets

ROUNDER BAR

This application is a continuation of the U.S. application Ser. No. 08/381,745 filed Feb. 1, 1995, now abandoned.

BACKGROUND OF THE INVENTION

1. Field of the Invention

The present invention relates in general to a rounder bar for use with conventional dough manufacturing equipment and, in particular, to form round pieces of dough.

2. Description of the Relevant Art

Dough manufacturing equipment is frequently used in a high speed process to create round balls of dough used to make various food products such as hamburger buns and english muffins. As these products are typically made in great volume, it is not unusual for a facility to make tens or even hundreds of thousands of dough balls in a single day. Accordingly, even a slight increase in throughput or decrease in the failure rate in making the dough balls is very desirable.

U.S. Pat. No. 2,858,775 issued to Marasso shows dough dividing or scaling equipment used in this high speed process. As described in detail in the Marasso patent, volumetrically scaled quantities of dough are delivered to one end of an endless conveyor belt. Located slightly above the upper surface of the conveyor belt is one or more rounder bars which are angularly offset from the direction of travel of the conveyor belt. The rounder bars have an angled face forming a pocket or opening with the belt for shaping the dough. As is known in the art, the pieces of dough conveyed by the belt engage the angled face and are forced to roll between the rounder bar and the belt. This rolling action forms the dough into a ball and develops an outer skin on the piece of dough. This skin reduces the stickiness of a dough and retains the gases contained within the dough. Additionally, the desired sphere shape of the dough ball is critical to ensure the dough is properly shaped to obtain the desired final appearance of the finished food product.

Because the dough is very sticky, there is a significant tendency for the dough to stick to the face of the rounder bar. As disclosed in the Marasso patent and U.S. Pat. No. 3,448,697 issued to Atwood, at one time it was common to apply a strip of TEFLON polytetrafluoroethylene material or a sprayed-on TEFLON polytetrafluoroethylene coating to the face of the bar to resist the sticking of the dough to the face of the bar. TEFLON polytetrafluoroethylene is a trade name of the DuPont Company. These bars with a sprayed on TEFLON polytetrafluoroethylene coating had a relatively short life span and needed to be recoated at frequent intervals. Bars with attached pieces of TEFLON polytetrafluoroethylene generally had a longer life span, but the glue used to hold the TEFLON polytetrafluoroethylene to the face of the bar needed to be frequently inspected and replaced. For this reason, it is currently the practice to use bars of solid TEFLON polytetrafluoroethylene or other non-stick materials, such as ultra high molecular weight polyethylene, reinforced with rectangular aluminum bars along the top and on the side of the bar opposite the face.

Despite extensive efforts, however, rounder bars still suffer from dough adhering to the face of the bar causing any one of a variety of problems. For example, a piece of dough may bump into a stuck piece of dough to produce a double ball, which must be rejected. Alternatively, even if the dough piece only sticks to the bar momentarily, the dough piece may elongate, resulting in a misshapen ball, which will form an improperly shaped baked product which will later be rejected. Furthermore, even if the momentary sticking does not misshape the dough ball, this sticking may slow the dough piece sufficiently that it reaches the end of the conveyor belt at a different time than the other similarly situated pieces of dough. This destroys the required timing of the high speed manufacturing process, and eventually results in more doubling of dough pieces.

The percentage of dough pieces that do not become the desired food product is called the cripple rate. Currently, a normal cripple rate in the industry is often approximately four to five percent, and sometimes higher. A significant factor contributing to this cripple rate is the failure of the rounder bars to make the correctly shaped spherical ball and the doubling of dough balls on the rounder bar.

As disclosed in U.S. Pat. No. 4,008,025 issued to Campbell, a conventional dough rounder bar has a face that engages the dough pieces. The face includes an entrance section defining a highly rounded cavity angling downwardly toward the conveyor belt. The distance from the top of the concave surface to the conveyer belt is about 1.25 inches, and sometimes less. This section rapidly decreases in concavity and height relative to the conveyor belt to form a smaller opening or pocket between the face and the belt. Consequently, this section of the bar compresses the dough and forms the desired skin. This compression of the dough occurs within a length of approximately three inches along the face of the bar. Other types of rounder bars have longer compression portions. This rapid, large compression of the dough forces the dough away from the face of the bar and creates a generally elongated or oblong piece of dough in the shape of a log, which is then formed into a round ball of dough by the expansion portion of the rounder bar.

Many rounder bars also have an expansion area that may extend about 36 to 40 inches in length. In the expansion area, the face of the bar increases in curvature and height to allow the dough pieces to expand. In many rounder bars, the face becomes essentially a flat surface that is perpendicular to the conveyor belt towards the exit end of the bar. Thus, the dough piece is essentially rolling against a wall. Further, some rounder bars have the face entirely removed or cut-away up to the last 12 inches of the bar. This allows the dough piece to roll freely and the bar no longer limits expansion of the dough piece.

In most situations, it is necessary to apply vegetable oil to the face of the rounder bar to prevent the dough from sticking to it. In applications where the dough is not particularly sticky, this practice is necessary to reduce the cripple rate to acceptable levels. In applications where the dough is particularly sticky, such as in the case of many English muffin doughs, the oil must be applied to even permit the automated system to function. Alternatively, it is also known to add oil to the dough itself to reduce the tendency of the dough to stick to the bar. With either method, the vegetable oil must be compatible with the particular food product being made. Obviously, this process of applying or adding the oil, as well as the cost of the oil itself, adds to manufacturing costs. Unfortunately, it is often undesirable to add any oil to the food product for reasons such as quality and health considerations.

Rounder bars also often have a shoe or blade that extends downwardly from the rounder bar toward the conveyor belt. As shown in U.S. Pat. No. 4,306,850 issued to Cummins, the shoe includes a flexible blade that contacts the conveyor belt to prevent the dough from bleeding or leaking underneath the bar. Bleeding of the dough underneath the bar disadvantageously allows subsequent pieces of dough to stick to the dough trapped under the bar. This is another factor that increases the cripple rate.

There are two types of blade arrangements in common use. The first is a fixed blade and the second is a blade mounted within a slot to a resilient foam. In both types of arrangements, the friction between the blade and the conveyor belt quickly wears the blade so that the entire bar must be repeatedly adjusted to bring the blade back in contact with the conveyor. To ensure that the blade and the conveyor stay in contact between adjustments, the bar is generally adjusted so that the blade applies a considerable amount of force to the conveyor. In addition, to prevent the entire bar from needing to be removed when the blade wears, the extension on the fixed blade and the portion of the blade extending out of the slot is usually at least one-half inch long. In addition to the blade, the continual scraping of the blade on the conveyor belt quickly wears out the belt, necessitating that they also be frequently replaced. For instance, the life span of the conveyor belt may be only ten days, or even less.

The friction of the blade contacting the conveyor belt also generates a significant amount of heat, which is transferred to the bar. The bar, which is frequently made of cast iron, readily absorbs the heat and this increases the temperature on the angled face of the bar. This heat increases the tendency of the dough to stick to the bar, and may degrade the quality of the food product.

Alternatively, instead of using cast iron, it is known to construct the rounder bar out of a high molecular weight material. This high molecular weight material is desirable because it has a high release value which tends to prevent the dough from sticking to the face of the bar. The pieces of dough, however, still stick to the face of the bar and the bar must be frequently replaced because it has a low wear resistance. This material is also very flexible and it must be attached to a rigid support member. The support member is often constructed from aluminum and is connected to the material by fasteners such as metal screws.

SUMMARY OF THE INVENTION

A need therefore exists for a rounder bar which creates round pieces of dough without the above-described disadvantages.

In accordance with one aspect of the present invention, the rounder bar is preferably constructed from an elongated body having a contact face on one side of the bar. The contact face preferably contains a plurality of recesses and extremities. These recesses and extremities may be aligned to create numerous ridges along the elongated length of the body. These recesses desirably range in depth from about 0.005 inches to about 0.050 inches and are most preferably about 0.010 inches.

Another aspect of the present invention involves a non-stick coating that may be applied to the contact face of the bar. Advantageously, the non-stick coating encapsulates substantially the entire bar. Preferably, this non-stick coating is TEFLON polytetrafluoroethylene, manufactured by the DuPont Company, which is approved by the United States Federal Drug Administration for direct contact with a food product.

In accordance with an additional aspect of the present invention, a 420-109 TEFLON polytetrafluoroethylene coating is applied to the contact face of the bar. Alternatively, the 420-109 TEFLON polytetrafluoroethylene coating may be used to encapsulate the entire bar. When used with an underbody of the desired configuration, use of this TEFLON polytetrafluoroethylene composite virtually prevents the dough from sticking to the rounder bar. Significantly, this version of TEFLON polytetrafluoroethylene can be used with numerous types of dough which have different physical properties, such as stickiness. For example, the 420-109 TEFLON polytetrafluoroethylene advantageously allows the rounder bars to be used to make English muffins, which is a very difficult type of dough to use.

A still further aspect of the present invention is the combination of a Teflon coating with a contact surface having a plurality of extremities and recesses. This combination creates a texture on the contact face such that the dough releases from the surface without sticking to the surface.

In accordance with a method of the present invention, a rigid elongated body is shaped to have a contact surface with a plurality of extremities and recesses. These extremities and recesses are aligned to comprise a plurality of ridges that extend along the length of the body. The bar is then cleaned by a method such as sandblasting, and primary coat is applied to the bar. A secondary coating is then sprayed on and baked onto the exterior surface of the bar to provide a non-stick surface.

Mother method of the present invention includes providing a elongated body with a contact surface. The contact surface is then coated with a substantially non-stick material such as 420-109 TEFLON polytetrafluoroethylene.

In accordance with another aspect of the present invention, a rounder bar is preferably constructed from an elongate body having a first end, a second end, a first side, a second side, and a top and a bottom. The elongate body defines an overhanging contact face that extends generally from proximate the first side and the bottom of the body toward the second side and the top of the body. The body defines a vertical cross-section of varying size as the contact face extends from the first end toward the second end. The contact face is formed by a rigid underbody covered by a non-stick layer and having a plurality of extremities and a plurality of recesses. The recesses have a depth of between 0.005 and 0.050 inches and the non-stick layer having a thickness between 0.004 inches and 0.010 inches.

Another aspect of the present invention involves an elongate body having a first end, a second end, a first side, a second side, and a top and a bottom. The body defines an elongate slot proximate the first side of the body that extends substantially the length of the body, and the body additionally defines an overhanging contact face that extends generally from proximate the first side and the bottom of the body toward the second side and the top of the body. The body also has a vertical cross-section of varying size and it forms a compression portion proximate the first end of the body which continuously decreases in height as the compression portion extends further from the first end of the body. The compression portion has a length of at least 16 inches and the contract face is at least partially comprising polytetrafluoroethylene. This embodiment also includes an elongate scraper with an edge along its length that is mounted at least partially within the slot.

In accordance with an additional aspect of the present invention, an elongate body having a first end, a second end, a first side, a second side, and a top and a bottom. The body defines an elongate slot proximate the first side of the body that extends substantially the length of the body and the body additionally defines a series of holes communicating with the slot. An overhanging contact face extends generally from proximate the first side and the bottom of the body toward the second side and the top of the body. The body defines a vertical cross-section of varying size as the contact face extends from the first end toward the second end. The contact face is formed by a rigid underbody substantially encapsulated by a non-stick layer and the rounder bar includes an elongate stainless steel scraper defining an edge along its length mounted at least partially within said slot. A series of springs mounted over a series of fasteners extending through a series of holes connects the scraper to the body such that the scraper has a travel of at least one-fourth of an inch with respect to said body.

BRIEF DESCRIPTION OF THE DRAWINGS

These and other features of the invention will now be described with reference to the drawings of a preferred embodiment, which is intended to illustrate and not limit the invention, wherein.

DETAILED DESCRIPTION OF PREFERRED EMBODIMENTS

Figure 1:
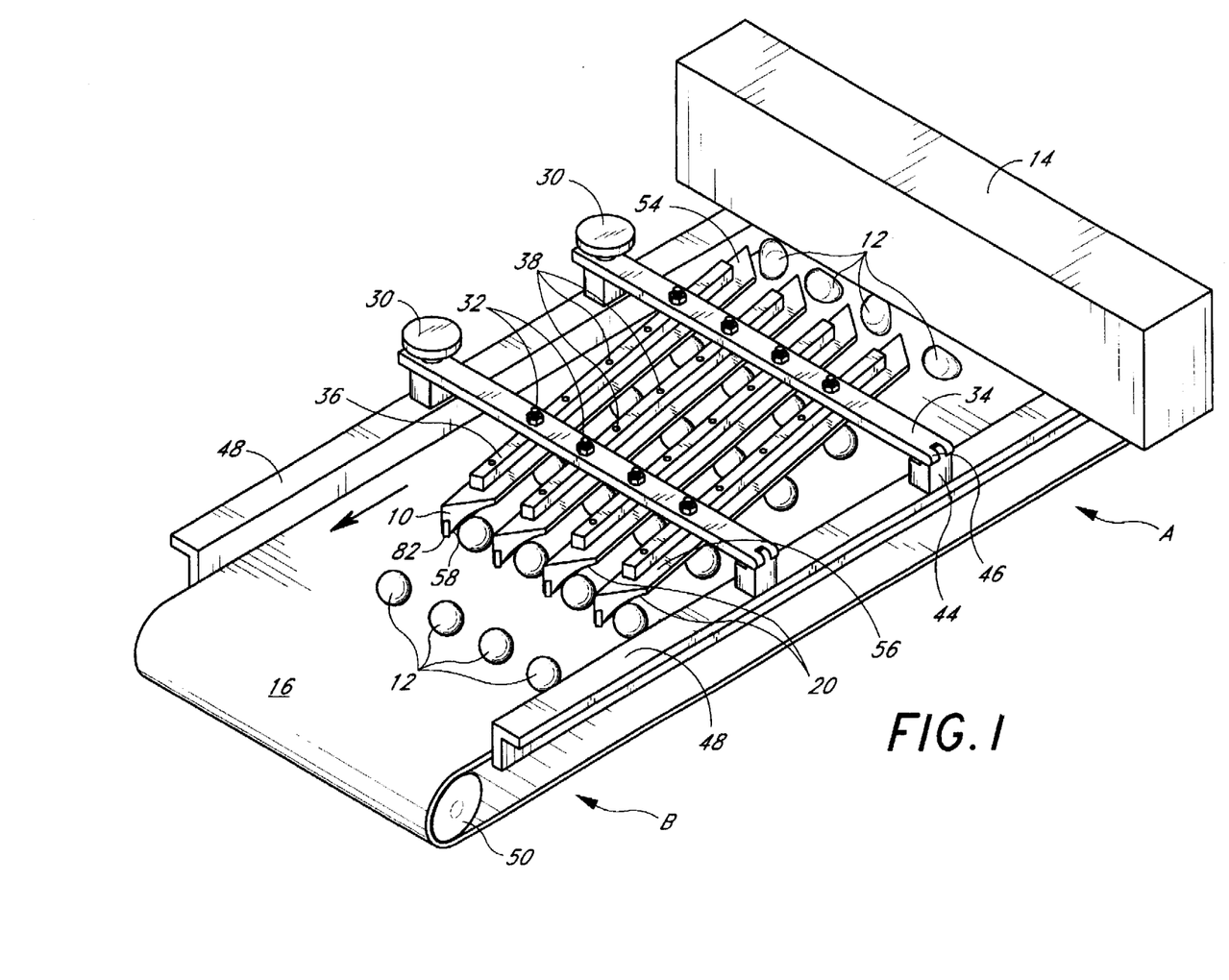
FIG. 1 is a perspective view of a conveyor belt and a rounder bar assembly in accordance with the preferred embodiment of the invention.

Referring to FIG. 1, a rounder bar 10 in accordance with the present invention is mounted with a series of identical rounder bars to a frame 48 for an endless conveyer belt 16 having a direction of travel illustrated by an arrow. At one end of the frame 48 is a dough dividing machine 14 and at the opposite end is an endless series of cups (not shown) for catching individual dough pieces 12.

Figure 2:
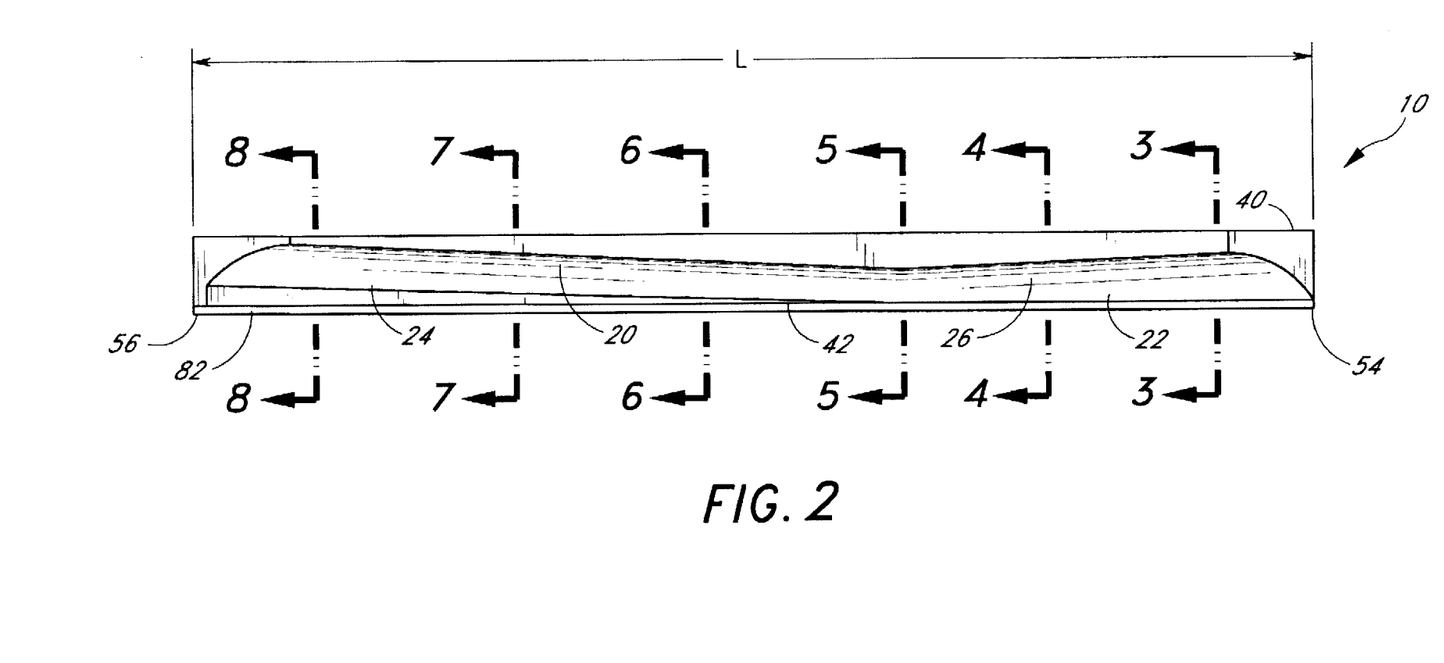
FIG. 2 is a side elevational view of a rounder bar shown in FIG. 1.
Figure 3:
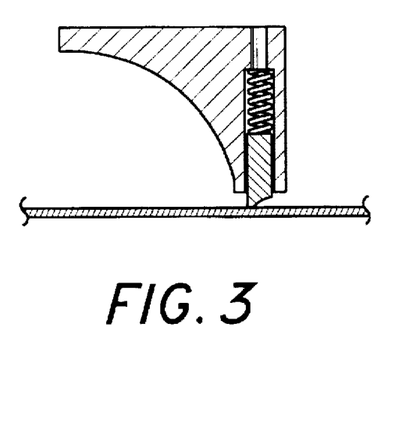
FIG. 3 is a cross-sectional view along 3—3 of FIG. 2.
Figure 9:
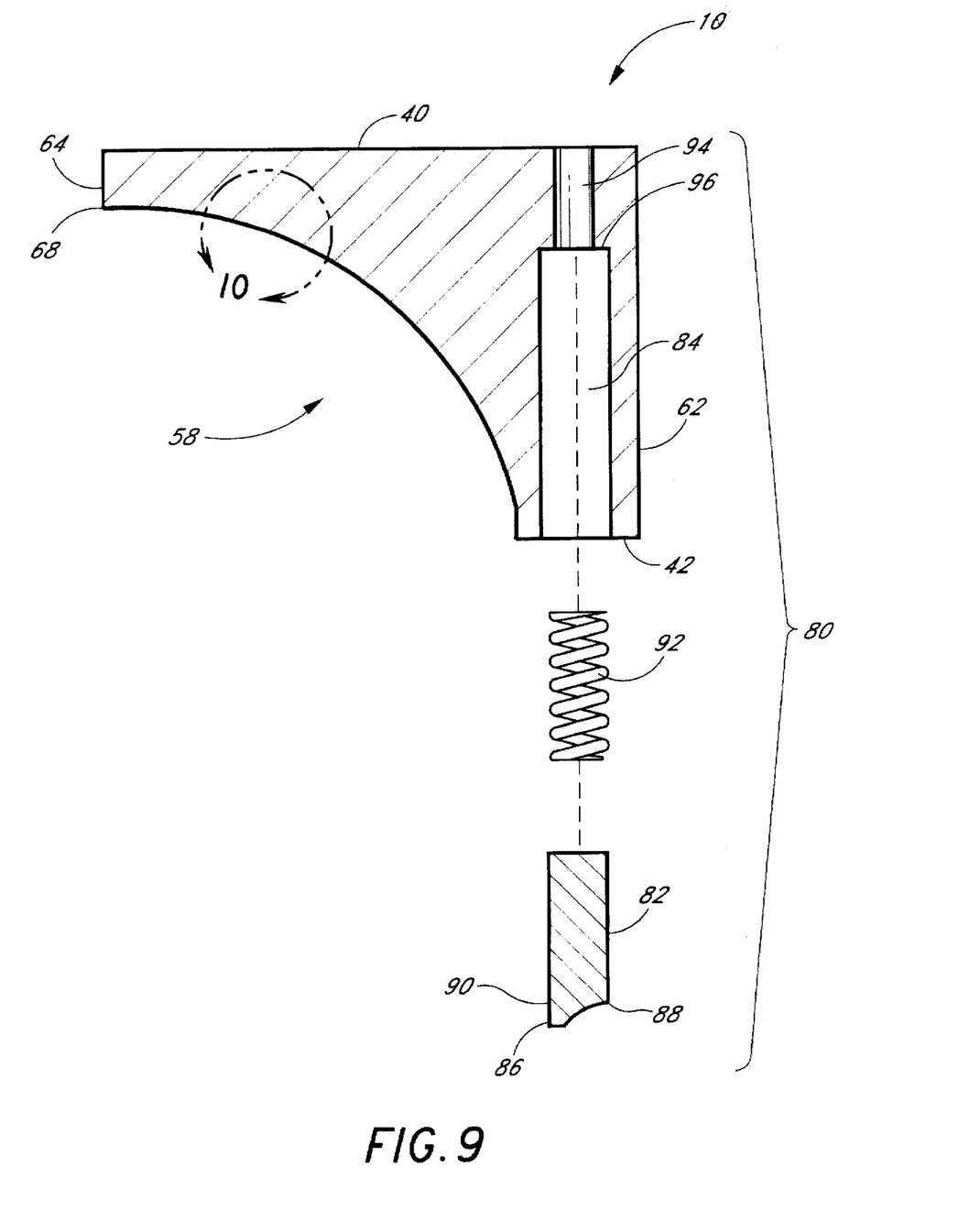
FIG. 9 is an exploded cross-sectional view of FIG. 2.

As best seen in FIGS. 2 and 9, the bar 10 includes a body having a top 40, a bottom 42, a compression end 54, an expansion end 56, a first side 62 and a second side 64. In addition, the bar 10 includes an elongate generally U-shaped surface which defines an elongate slot 84 which opens to the bottom and extends the length of the bar 10. A scraper 82 is mounted within the slot 84, in a manner which will be discussed in detail below. The body of the bar is defined by an elongate underbody and a layer of anti-stick material or coating.

The compression section 22 begins at the compression end 54 of the bar and extends to the expansion section 24. The expansion section 24 begins at the end of the compression section 22 distal the expansion end 56 of the bar and extends to the expansion end 56 of the bar 10. Thus, the contact face 20 extends substantially the entire length of the bar 10 from the compression end 54 to the expansion end 56 of the rounder bar 10.

The compression section 22 is advantageously at least 16 inches in length, measured from the compression end 54 of the bar 10. The compression section 20 is more preferably between 19 and 36 inches in length, and is most preferably 24 inches in length.

The expansion section 24 extends from the expansion end 56 of the bar to the compression section 22. The expansion section 24 is desirably about 44 to 20 inches in length, more desirably about 41 to 24 inches in length and most desirably about 36 inches in length. It will be understood that, because the length of the expansion section 24 is dependent upon the length of the bar 10 and the length of the compression section 22, the length of the expansion section 24 may vary within a large range.

Figure 4:
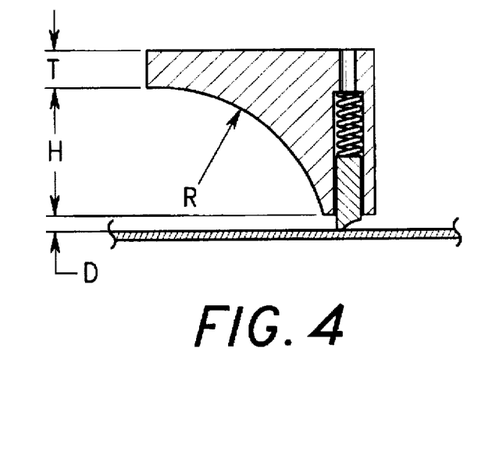
FIG. 4 is a cross-sectional view along 4—4 of FIG. 2.

As seen in FIG. 4, the contact face 20 has a height H measured from a plane containing the bottom 42 of the bar 10 to the upper edge 68 of the contact face 20. The upper edge 68 is the point at which the contact face 20 and the second side 64 intersect. Proximate the compression end 54 of the bar 10, the height H of the of the contact face is preferably about 1.4 to 1.7 inches, more preferably about 1.4 to 1.65 inches and most preferably about 1.6 inches.

The chart below provides the distance X, height H and thickness T at six inch intervals measured from the compression end 54 of the bar 10.

| Distance X (inches) | Thickness T (inches) | Height H (inches) |
| --- | --- | --- |
| 6.0 | .89 | 1.36 |
| 12.0 | 1.03 | 1.23 |
| 18.0 | 1.08 | 1.18 |
| 24.0 | 1.12 | 1.13 |
| 30.0 | .95 | 1.30 |
| 36.0 | .83 | 1.43 |
| 42.0 | .65 | 1.60 |
| 48.0 | .43 | 1.83 |
| 54.0 | .20 | 2.05 |

As seen in the chart, the height H and the thickness T vary along the length of the bar 10. Specifically, the height H decreases along the length of the bar 10 and the thickness T increases until full compression is desirably reached at preferably 24 inches from the compression end 54 of the rod 10.

A radius of curvature R of the rounder bar 10 decreases in size in the compression section 22. The radius of curvature R of the compression section 22 proximate the compression end 54 of the bar 10 is about 2.1 to 2.4 inches, more preferably about 2.19 to 2.31 inches and most preferably about 2.25 inches. This radius gradually decreases to a radius of about 1.85 to 2.15 inches, more preferably about 1.94 to 2.06 inches and most preferably about 2.0 inches.

Figure 6:
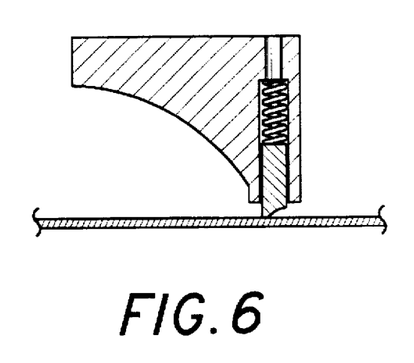
FIG. 6 is a cross-sectional view along 6—6 of FIG. 2.
Figure 7:
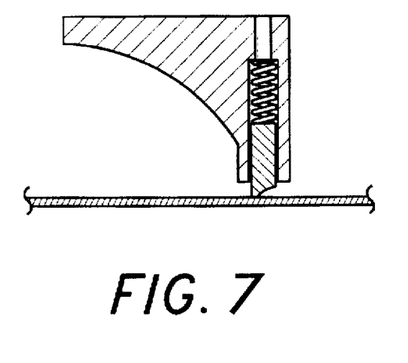
FIG. 7 is a cross-sectional view along 7—7 of FIG. 2.
Figure 8:
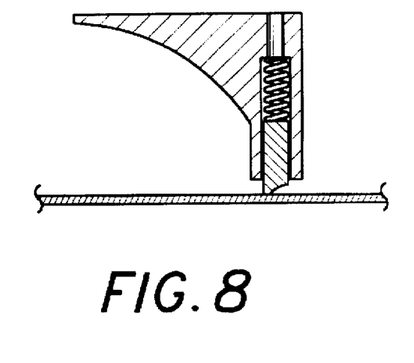
FIG. 8 is a cross-sectional view along 8—8 of FIG. 2.

The contact face 20 then gradually begins to increase in radius of curvature R as seen in FIGS. 6–8. This change in radius from gradually decreasing to gradually increasing is sworfing, similar to the twisting on a propeller blade. This creates a smooth transition or turning from a gradually decreasing radius to a gradually increasing radius. The increasing radius of curvature is the expansion section 24 of the bar 10 allows the dough pieces 12 to expand in size.

It should be understood that the rounder bar 10 can be utilized to manufacture dough balls of different sizes, without requiring changes or modification of the design. For example, the same rounder bar 10 is used to make dough balls with a diameter of approximately 2.5 inches, which creates a larger-sized hamburger bun and a dough ball with a diameter approximately 1.75 inches which creates a regular-sized hamburger bun. Thus, as different sized food products are to be manufactured, the rounder bar 10 is equally applicable to manufacture dough balls of different sizes.

The bar 10 is preferably constructed from a substantially non-flexible material such that it retains its shape without the need for any additional supporting members. A metal bar is preferred because it is highly wear resistant and it can be readily manufactured into the desired shape. Aluminum is preferably used to construct the bar 10 because it is lightweight, does not rust and has excellent heat dissipation. As discussed below, aluminum desirably prevents heat from building up in the contact face 10 of the rounder bar 10 because as the temperature of the contact face 10 increases, the dough has a greater tendency to stick to the bar 10. Those skilled in the art will appreciate the extensive list of materials which may be used to form the rounder bar, including other metals, plastic, glass and ceramics that have the desired characteristics. These materials can be used in an alternative, less desired embodiment of the invention.

The bottom 42 of the rounder bar 10 does not contact the conveyer belt 16, but as described below, a scraper 82 contacts the conveyer belt 16 and prevents the dough from being caught underneath the rounder bar 10. Thus, the bottom 42 is positioned a distance D above the upper surface of the conveyer belt 16 such that it prevents engagement of the bottom 42 of the bar 10 with the conveyer belt 16.

Figure 10:
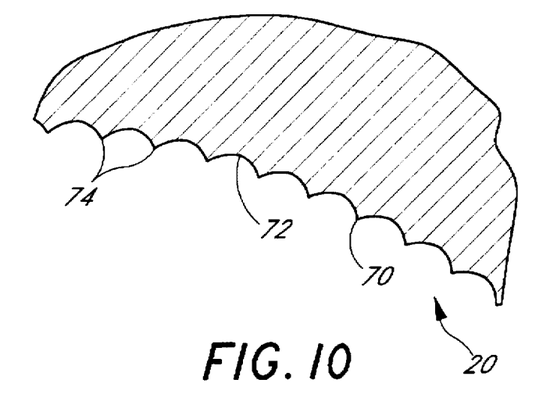
FIG. 10 is a partial cross-sectional view along 10—10 of FIG. 9.

As seen in FIGS. 9 and 10, located on the contact face 20 is a textured surface having a plurality of extremities 70 and a plurality of recesses 72. The extremities 70 and the recesses 72 are located in the contact face 20 and they provide the fine textured surface of the contact face 20. As illustrated in FIG. 9, the extremities 70 are outwardly extending projections from the contact face 20 and the recesses are inwardly extending channels or notches in the contact face 20. The recesses 72 generally extend inwardly from the contact face 24 at a depth of about 0.005 to 0.050 inches, and more desirably a depth of about 0.010 inches. The adjacent extremities 72 are preferably spaced apart by about 0.025 to 0.075 inches. More preferably the adjacent extremities are preferably spaced apart by about 0.035 to 0.065 inches, and 0.050 inches is the most preferred.

Figure 13:
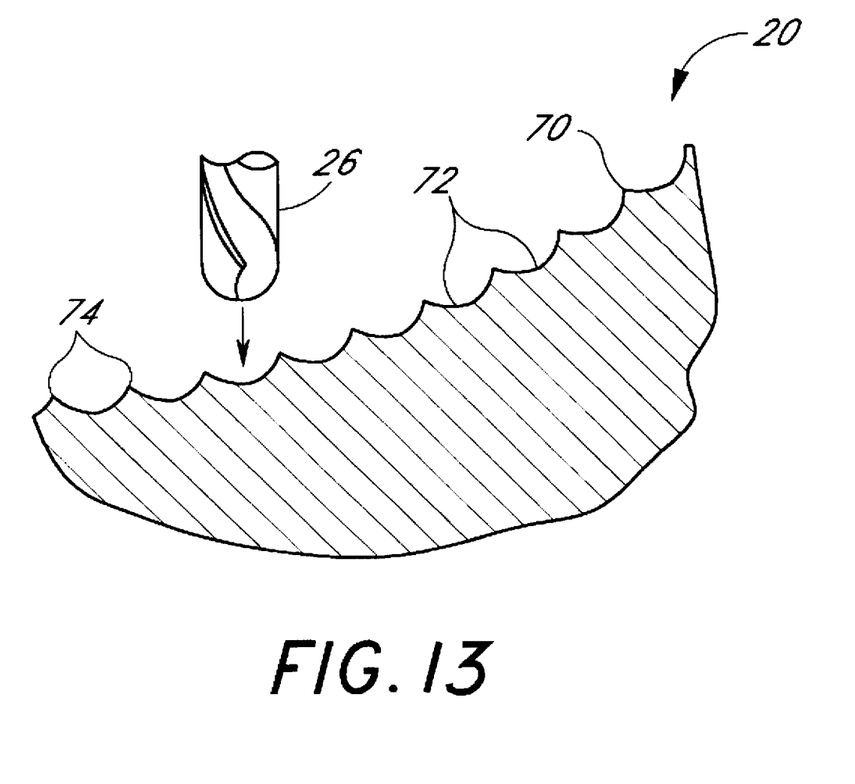
FIG. 13 is a rotated view of FIG. 10, illustrating a ball end mill.

The extremities 72 are preferably aligned to create ridges 74 that extend along the bar 10. While the orientation of the ridges 74 may vary along the contact face 24, the ridges 74 preferably extend generally parallel to the elongated bar 10. As seen in FIG. 13, the ridges 74 are preferably milled into the contact face 20 by using a ball end mill 26 that has a diameter of approximately 1.25 inches. Following the precise height H and radius of curvature R for a given segment of the bar 12, as described in detail above, the contact face 24 is preferably milled in increments of about 0.050 inches. The tolerance of the increments is preferably within the range of 0.010 to 0.015 inches, but it will be understood that the increments may vary within the range of about 0.025 inches to about 0.075 inches. As known and understood in the art, numerous manufacturing techniques may be used to create the extremities 70, recesses 72 and ridges 74 on the contact surface 24 of the bar.

The ridges 74 are an important aspect of the invention because they create a slightly bumpy surface or texture on the contact face 20. The ridges 74 are preferably constructed in the contact face 20 because they can be easily machined into the face 20. The ridges also allow the dough to contact the extremities 70 and all or a part of the recesses 72. This may limit the amount of dough in contact with the outer surface of the contact face 20 to prevent sticking of the dough to the surface. The ridges also help prevent the dough pieces 12 from sticking to the contact face 20 because if the surface is too smooth, the dough forms a seal and sticks to the contact face 20. On the other hand, if the surface is too rough, the dough again sticks to the contact face 20. Thus, the size of the ridges in an important aspect because it prevents sticking and sliding of the dough piece to the contact face 20. This desirably decreases the cripple rate.

Figure 11:
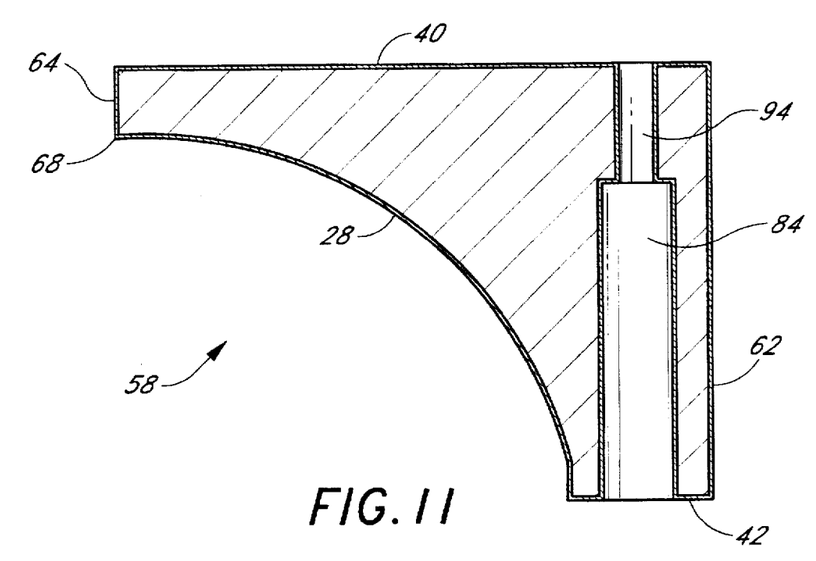
FIG. 11 is an enlarged cross-sectional view of the rounder bar of FIG. 2, illustrating an underbody encapsulated by a Teflon layer.

Another important aspect of the preferred embodiment is that at least a portion of the underbody corresponding to the contact face 20 of the bar 10 is covered with a layer of non-stick coating 28. Alternatively, the entire bar 10 may be encapsulated by the coating 28. The coating 28 should be approved by the U.S. Food and Drug Administration for direct contact with the food product. By encapsulating the entire bar 10 with the coating 28, this desirably eliminates the concern of having exposed surfaces that should not contact the food product. The coating 70 is preferably 420-109 TEFLON polytetrafluoroethylene manufactured by the DuPont Company.

The non-stick coating 28 is preferably applied by placing the rounder bars 10 in an oven at about 750° F. for about one hour. The bars 10 are then cleaned by means such as sandblasting and sanding. The first coat of 420-109 TEFLON polytetrafluoroethylene is then applied to a thickness of about 0.002 inches to about 0.010 inches and it is baked on for about 15 minutes at about 600° F. After the bar has cooled, a second coat of 420-109 TEFLON polytetrafluoroethylene is applied and it is baked on for about 15 minutes at about 750° F. This process creates a TEFLON polytetrafluoroethylene thickness of about 0.010 to 0.015 inches.

As illustrated in FIG. 9, the bar 10 includes a shoe 80 that engages the conveyer belt 16 to prevent the dough from bleeding or leaking under the bar 10. The shoe 80 contains an elongated scraper 82 that is at least partially disposed within an elongated slot 84 in the bottom 42 of the bar 10, proximate the conveyer belt 16. The slot 84 preferably forms a groove that extends longitudinally along substantially the entire length L of the bar 10. The scraper 84 is preferably constructed from a rigid material such as stainless steel, but it will be readily appreciated that a wide range of materials may be used to construct the scraper 82. Stainless steel is preferred because it is very hard and wear resistant. Stainless steel is also approved by the U.S. Food and Drug Administration to be in direct contact with the food product. Finally, stainless steel is resistant to the sticking of the dough. Alternatively, other materials such as metals, plastics, Teflon, and ceramics may be used, but they are less desirable because they do not have the above-described beneficial characteristics.

As best seen in FIG. 9, the scraper 82 has a leading edge 86 and trailing edge 88. The leading edge 86 extends proximate the front face 90 of the scraper 82 and is constructed to continuously engage the conveyer belt 12 such that no dough bleeds or leaks underneath the bar 10. Positive engagement of the scraper 82 with the conveyer belt 12 is caused by a plurality of springs 92 or other resilient members located between the scraper 82 and bar 10. The springs 92 are preferably aligned with a series of apertures 94 that extend from the top 40 of the bar 10 to the upper surface 96 of the elongated slot 84. A fastener (not shown) preferably extends at least partially through each aperture 94 and is in communication with the scraper 82.

The springs 92 allow the scraper 82 to move vertically relative to the bar 10. Preferably, the scraper 82 can move at least 0.25 inches relative to the bar 10, and more preferably 0.375 inches. Because the scraper 72 has a flat bottom surface, the scraper 82 corresponds to the flat upper surface of the conveyer belt 12. In contrast to known scrapers which were flexible and required a large force to keep the scraper in contact with the conveyer belt, the preferred invention uses springs 92 to provide a relatively small amount of force of the scraper 82. A small amount of force is necessary because the stainless steel wears out very slowly. Thus, the scraper 82 does not have to be forcefully pushed downward to compensate for the rapidly worn away material. Because relatively light pressure is required to engage the scraper 82 with the belt 10, this increases the life span of the belt 10. Additionally, because only the leading edge 86 is in the contact with the belt 10, there is only a small area of contact, wear and friction between the belt 10 and scraper 82. For instance, experience has shown that in applications where belts typically wore out within ten days, with the rounder bar of the preferred embodiment, a belt can last in excess of 6 months.

The relatively small force on the conveyer belt 16 eventually wears away the leading edge 86 of the scraper 82. However, the springs 92 keep the scraper 82 in contact with conveyer belt 16 such that the bar 10 does not have to be continually readjusted as the scraper 82 wears out. In addition, because the scraper 82 has preferably 0.325 inches of travel to wear before it must be replaced, the scraper 82 does not have to be periodically adjusted and the life span of the bar 10 is much greater than any known rounder bars. This reduces maintenance and down time. This also keeps the distance from the contact face 24 to the belt 12 constant so the shape of the dough balls do not change as the scraper 82 wears out. Thus, uniformly shaped dough balls are formed over the life of the bar 10 preferably of the wear of the scraper 82.

The distance from the bottom 42 of the bar 12 to the conveyor belt is preferably much less than 0.25 of an inch and is most desirably between about 0.060 and 0.080 inches. This significantly limits the amount of the scraper 82 that is exposed and in possible contact with the dough. This is very important because it permits the scraper 82 to be manufactured without a textured surface or non-stick coating. Thus, the dough has a greater tendency to stick to the scraper 82. However, because of the very small exposure of the scraper 82, this virtually eliminates sticking of the dough to the scraper 82.

The scraper 82 and the rounder bar 10 are both preferably constructed from strong, non-flexible materials. This allows for very tight tolerances between the sides of the scraper 82 and the corresponding sides of the elongated slot 84. In particular, a gap or opening 100 between the bar 10 and a front face 90 of the scraper 82 is very small because there is no flexing of either member. In fact, the gap 100 is of such a size that virtually no dough enters the gap 100 and impair the movement of the scraper 82 relative to the bar 10.

The continuous engagement at the scraper 82 with the belt 12 causes friction which generates heat. This heat can then be transferred from the scraper 82 to the bar 10 and contact face 20. Because the bar 10 is constructed from a heat dissipating material such as aluminum, this heat is dissipated before the temperature of the contact face 20 increases. In addition, much less heat is generated using the scraper 82 of the preferred embodiment because much less force, as described above, is used to hold the scraper 82 in contact with the conveyer belt 16. This correspondingly reduces the heat generated in the scraper 82 and requires less heat to be dissipated by the bar 10.

Figure 12:
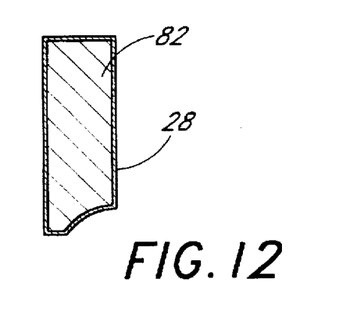
FIG. 12 is an enlarged cross-sectional view of the scraper shown in FIG. 9, illustrating a Teflon layer.

The scraper 82 may also have a non-stick coating 102 applied to the front face 90 or the entire scraper 82 may be encapsulated with the non-stick coating 102. Preferably, this non-stick coating is 420-109 TEFLON polytetrafluoroethylene. This coating ensures that the dough will not stick to the scraper 82 and that all surfaces exposed for direct contact with a food product is allowed by the U.S. Food and Administration. Although not illustrated, the rounder bar 10 may also be divided into first and second members. These first and second members generally correspond to the first and second half of a typical rounder bar 10. The length of the first and second members are preferably about 24 to 30 inches in length, but it will be recognized that they can be of any various length depending upon the particular characteristics of the respective dough machine. These first and second members extend generally transversely to the conveyer belt and are angularly disposed to each other. Thus, the first member extends transversely in one direction relative to the conveyor belt such that the piece of dough engages the first member and moves in that direction across the belt. At the end of the first member, the first piece of dough is released and engages the second member which extends at the opposite angle to the first member. Thus, the dough ball is formed by engaging the first member and the second member.

It will be understood and recognized that these first and second members may be disposed at a plurality of angular relationships with respect to the conveyor belt 12. Further, the length of the first and second members may range according to factors such as the width and length of the conveyor belt. Finally, in a preferred embodiment, the first member is generally the same as the first half of a typical rounder bar 10 and the a second member is a mirror image of the first half of the bar. In an alternative embodiment, the second member may correspond to the mirror image of the second half of the rounder bar.

As seen in FIG. 1, the rounder bars 10 are mounted at an angle with respect to the direction of travel of the conveyer belt 16. The rounder bars 10 are adapted to receive the dough pieces 12 from the dough dividing machine 14 which simultaneously deposits volumetrically scaled pieces of dough 12, but in irregular shapes, to a first end A of the conveyer belt 16. As seen in FIGS. 1 and 2, the rounder bar 10 has a contact face 20 which is the surface of the bar 10 adapted to actually shape the dough pieces. The contact face 20 includes a compression section 22 that compresses the dough and an expansion section 24 that allows the dough to expand. The compression section 22 is located proximate the dough dividing machine 14 and the expansion section 24 is located proximate a discharge end B of the conveyer belt 16.

The four rounder bars 10 are held in position relative to the conveyor belt 16 by one or more rounder bar assemblies 30. A rounder bar assembly 30 may include a series of fasteners 32 that are attached to a cross-member 34 extending across the conveyor belt 16. The fasteners 32 are preferably threadably connected at one end to the cross-member 34 and the other end to an elongated rod 36 attached to the top or upper surface 40 of the bar 10. This elongated rod 36 may be attached to the bar 10 be means such as fasteners 38. Alternatively, the fasteners 32 may be connected directly to the bar 10. It will be recognized that numerous methods may be used to connect both the elongated rod 36 to the bar 10 and the cross-member 34 to the bar 10, for instance springs, resilient members, bolts and screws may be utilized. Most preferably, the connection between the rod 10 and the cross-member 34 is adjustable to readily position the bottom or lower surface 42 of the bar 10 relative to the upper surface of the conveyor belt 16.

The cross-members 34 are held in a generally fixed location by brackets 44. The cross-members 34 may be connected by a hinge 46 to the brackets 44 to allow access to the rounder bars 10, or the cross-members 34 may be releasably secured to the brackets 44 by means such as screws or bolts. The cross-members 34 may also allow adjustment of the angular offset of the bars 10 relative to the direction of travel 18 of the conveyor belt 16. The brackets 44, in turn, are attached to the frame 48 of the conveyor belt 16 to securely support the rounder bar assemblies 30, as are rollers 50 and 52 which support the conveyer belt 16. It will be understood that while four brackets and two cross-members are illustrated in FIG. 1, any number of brackets or cross-members may be used to support the rounder bars 10 relative to the conveyor belt 16.

Operation

The operation of the rounder bar 10 of the present invention will now be described, with reference to FIGS. 1, 2 and 9. The dough divider 14 drops a plurality of dough pieces 12 onto the conveyor 16 which transports the dough pieces toward the compression end 54 of the respective rounder bars. As shown in the drawing, the dough pieces 12 are aligned generally perpendicular to the sides of the conveyor. It is important that this alignment be maintained throughout the rounding of the dough pieces so that the rounded dough pieces 12 can be simultaneously deposited into containers at the downstream end B of a conveyor.

Advantageously, the size, shape, texture and composition of the rounder bars are such that the dough pieces form unusually uniform, well-rounded pieces of dough at an accelerated uniform rate, without sticking to the rounder bars.

Specifically, the contact face 20 forms a pocket 58 with the conveyor belt 16 to shape the individual pieces of dough 12 into balls, and each rounder bar 10 is positioned such that the dough engages the contact face 20 substantially the entire length of the bar 10.

Once the dough piece contacts the contact face of the compression section, the compression section 22 gradually compresses and forms a skin on the dough. Significantly, the relatively long compression section 20 compresses the dough sufficiently slowly that the speed of the dough piece is not substantially reduced. This desirably increases the speed in which the dough balls can be formed.

Additionally, since the dough is desirably slowly compressed over a relatively long length of the compression section, a better skin forms about the piece of dough. This skin decreases the stickiness of the dough and helps prevent the dough from adhering to the bar 10. The relatively slow compression rate of the bar 10 also does not force a significant portion of the dough away from the contact face 20 so that an extended, log-shaped piece of dough is formed. Instead, the dough remains in a much more circular shape and less reshaping of the dough is subsequently required.

As discussed above, the contact face 20 has a radius of curvature R that varies from the compression section 22 to the expansion section 24 of the bar 10. This varying radius of curvature R changes the size of the pocket 58 between the bar 10 and conveyer belt 16. Because the contact face is a radius, the bar 10 imparts a rotational force on the dough piece 12 as it travels along the face of the bar 10. The changing radius of curvature combined with the continuously changing center of the radius of curvature also changes the direction of the resultant resistance force provided by the contact face 20. This causes the dough piece 12 to be rolled about different axes of rotation because the radius of the contact face 20 is continually changing. Moreover, because the contact face 20 extends substantially the entire length L of the bar 10, the dough piece 12 is being rounded the entire length L of the contact face 24.

It will be appreciated the contact face 20 may contain relatively flat or straight surfaces, but these surfaces tend to cause the dough to rotate about a single axis which allows the dough to form an oblong or egg-shaped dough ball. Further, the bar 10 can be shortened in length L to allow the dough to roll freely proximate the discharge end B of the conveyer 16, or the end of the bar may contain a substantially flat, upright surface. However, because the dough is not being rounded by a curved surface, these surfaces do not assist in creating a well-round dough piece and they may allow the dough to become further elongated or egg-shaped. It will be recognized, however, that the contact face 48 may comprise different shapes other than a curved surface, including flat and angled surfaces, compound sections, discrete steps or a combination of different surfaces. These surfaces do not create the desired well-round spherical piece of dough but, in combination with other features of this invention, they may yield improved results.

As summarized in the chart above, the contact face 20 engages the piece of dough 12 proximate the compression end 54 of the compression section 22. The radius of curvature R at the compression section 22 is approximately 2.15 to 2.3 inches, and more preferably about 2.19 to 2.31 inches, and most preferably about 2.25 inches. The height H from the upper edge 68 to the conveyor belt 16 is preferably within the range of 1.4 to 1.7 inches, and more preferably within the range of 1.40 to 1.65 inches, and most preferably 1.600 inches.

Figure 5:
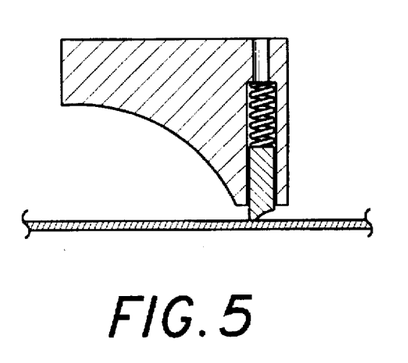
FIG. 5 is a cross-sectional view along 5—5 of FIG. 2.

As the dough piece 12 begins to travel down the contact face 20 of the bar 10, the radius of curvature R gradually decreases. As seen in FIG. 4, the radius of curvature R has decreased and the dough is slowly compressed. Additionally, the height H of the contact face 24 gradually decreases and the size of the pocket 58 steadily diminishes. As seen in FIG. 5, the contact face 48 is at full compression and the radius of curvature is about 1.8 to 2.2 inches, and more preferably within about 1.94 and 2.06 inches, and most preferably 2.00 inches. The height H from the upper surface edge 68 of the contact face 24 to the conveyor belt 12 decreases to about 1.12 inches. This is the smallest size of the pocket 58 corresponds to the greatest compression of the dough. Because the decrease in height H from the compression section 22 to the full compression of the bar 10 is only about 0.5 inches and the compression occurs over a length of at least 16 inches, the dough is not forced away from the contact face 24 such that it forms a elongated or log-shaped piece of dough. Instead, the dough remains in a much more spherical shape. Additionally, the compression of the dough over this relatively long length of the bar 10 does not significantly decrease the speed of the dough piece 12.

The dough piece then passes the location of maximum compression and enters the expansion section. As seen in FIGS. 6–8, in the expansion section the radius of curvature increases from about 2.00 inches to about 2.65 to 2.85 inches proximate the second end 28 of the bar 10. More preferably the radius of curvature R is about 2.69 to 2.81 inches and most preferably about 2.75 inches. This expansion section 22 allows the dough pieces 12 to gradually expand in size.

Because the radius of curvature R extends to the expansion section 24 of the bar 10, the expansion section 22 remains in contact with the dough piece 12 to the end of the bar to limit the expansion of the dough piece 12. Additionally, the ball is continually being rounded because the curved contact face 24 extends substantially to the end 56 of the bar 10. Further, because the contact face 24 is always increasing in radius R and height H, the dough pieces 12 are continually being rolled on a slightly different axis of rotation. This helps prevent oblong or egg-shaped pieces of dough from being formed. Preferably, there are no flat or non-curved surfaces on the compression section 22 that would tend to create lopsided or egg-shaped pieces of dough. It will be recognized, however, flat and other surfaces may be used to create a dough ball. These dough balls will not obtain the desired uniform, spherical shape but it may be an improvement over known rounder bars.

As discussed above, the shape of the contact face 48 gradually changes along the length L of the bar 10. Thus, there is a relatively smooth transition from the first end 40 towards the second end 42 of the bar 10. A smooth and gradual transition allows a dough piece 12 to travel at a relatively constant speed along the face of the bar 10. It is important because if the dough travels too fast down the face of the bar 10, it will slide and not be rolled into the proper spherical shape. Alternatively, if the dough travels to slowly, it may stick to the rounder bar 10, and any non-gradual changes may cause undesired doubling of the dough balls. It will be understood, however, that a smooth transition is not critical. For example, the radius of curvature R may change abruptly, in discrete steps or in varying increments. Additionally, the cross-section of the bar 10 may not be concave and the contact face 24 may contain essentially flat sections. Thus, a gradually changing radius R or height H is not required because the other features of the invention may be used to create an improved rounder bar 10.

Significantly, the non-stick coating 70 has a relatively long life and a relatively low coefficient of friction to prevent the dough from sticking to the rounder bar. In addition, this version of TEFLON polytetrafluoroethylene works well with different types of dough having different physical properties such as stickiness. In fact, 420-109 TEFLON polytetrafluoroethylene is particularly adapted to work well with English muffin dough which is very difficult to use in a conventional manufacturing process because of its stickiness.

The 420-109 TEFLON polytetrafluoroethylene coating is preferably used in conjunction with the textured surface to cover the contact face 20 to create a slightly bumpy texture with a non-stick coating. This combination prevents the dough from sticking to the surface of the bar 10 and increases the speed of the dough traveling across the contact face 24. This allows a greater number of dough balls to be manufactured at the same speed of the conveyor belt. Alternatively, the speed of the conveyor belt may be reduced while still maintaining the same output of the machine. Specifically, experience has shown that by using the rounder bar of the present invention, a conveyor belt having a setting range of 0–10 can be reduced from a setting of 9 to a setting of 3, while retaining the same throughput of the machine. This advantageously increases the life of the conveyor belt and decreases wear and tear on the machine.

Although this invention has been described in terms of certain preferred embodiments, other embodiments apparent to those of ordinary skill in the art are also within the scope of this invention. Accordingly, the scope of the invention is intended to be defined only by the claims which follow.

I claim:

1. A rounder bar for forming pieces of dough in cooperation with a machine having a conveyor, comprising:

an elongate body having a first end, a second end, a first side, a second side, a top and a bottom, said body additionally defining an overhanging contact face extending generally from proximate said first side and said bottom of said body toward said second side and said top of said body, said body defining a vertical cross-section of varying size as said contact face extends from said first end toward said second end, said contact face formed by a rigid underbody covered by a non-stick layer, said underbody defining a textured surface defining a plurality of extremities and a plurality of recesses, said recesses having a depth of between approximately 0.005 inches and approximately 0.050 inches and said non-stick layer having a thickness between approximately 0.010 inches and approximately 0.015 inches, each of said plurality of extremities is spaced from an adjacent extremity by approximately 0.05 inches and said plurality of extremities comprise parallel ridges.

2. The rounder bar of claim 1, wherein said body defines an elongate slot proximate said first side of said body and said bar further comprises an elongate scraper defining an edge along its length mounted within said slot.

3. The rounder bar of claim 2, wherein said body further comprises a series of holes communicating with said slot and said bar further comprises a series of springs mounted over a series of fasteners extending through said series of holes and connecting said scraper to said body such that said scraper is movable relative said body.

4. The rounder bar of claim 3, wherein said slot is sized and said series of springs and said series of fasteners are sized and mounted such that said scraper has a travel of at least one-fourth of an inch with respect to said body.

5. A rounder bar for forming pieces of dough in cooperation with a machine having a conveyor, comprising:

an elongate body having a first end, a second end, a first side, a second side, a top and a bottom, said body additionally defining an overhanging contact face extending generally from proximate said first side and said bottom of said body, said body defining a vertical cross-section of varying size as said contact face extends from said first end toward said second end, said contact face formed by a rigid underbody covered by a non-stick layer, said underbody defining a textured surface defining a plurality of extremities and a plurality of recesses, said plurality of recesses having a depth of between approximately 0.005 inches and 0.050 inches/and said plurality of extremities comprising parallel ridges.

6. The rounder bar of claim 5, wherein each of said plurality of extremities is spaced from an adjacent extremity by approximately 0.025 inches to 0.075 inches.

7. The rounder bar of claim 6, wherein said non-stick layer comprises polytetrafluoroethylene.

* * * * *